Patented Jan. 2, 1945

2,366,217

UNITED STATES PATENT OFFICE 2,366,217

CATALYTIC PROCESSES FOR CONVERTING HYDROCARBONS

Robert F. Ruthruff, Chicago, Ill.

No Drawing. Application July 22, 1940,
Serial No. 346,809

5 Claims. (Cl. 196—50)

The present invention relates to catalytic materials and methods for the preparation thereof. More particularly, the present invention relates to catalytic materials useful in accelerating the conversion of hydrocarbons of relatively low value and utility into hydrocarbons of higher utility and value and to methods for the preparation thereof. Still more particularly, this invention relates to improved catalysts comprising modified natural minerals and to methods for the preparation thereof. Specifically, this invention relates to improved contact agents for catalyzing hydrocarbon conversion reactions, said contact agents comprising modified natural minerals, and to methods for the preparation thereof. Additionally, this invention relates to the conversion of hydrocarbons of relatively low utility and value into hydrocarbons of higher utility and value, employing modified natural minerals of a particular class as catalysts for accelerating said conversion.

The employment of various silica-alumina complexes, both natural and synthetic, for accelerating the conversion of hydrocarbons of relatively low utility and value into hydrocarbons of higher utility and value is becoming well known in the art. For example, the employment of activated clays of the bentonite or montmorillonite type as catalysts for accelerating the conversion of hydrocarbons boiling above the usual gasoline range into hydrocarbons boiling within the usual gasoline range has already been exploited on the commercial scale. Such catalysts are usually prepared by activating clays of the aforementioned types by treating them with dilute mineral acids at elevated temperatures. By this procedure, such materials as alkali metal oxides, alkaline earth oxides and iron oxides are more or less completely removed together with more or less aluminum oxide. As this activating treatment is continued, the activity of the resulting product as a catalyst for the previously described process reaches a maximum and then declines with further treatment. Activated clays showing maximum catalytic effect for the previously mentioned conversion process usually have a silica to alumina weight ratio of about 4 to 1, more or less. For further information on these materials reference may be had to United States Patent 2,078,945, issued May 4, 1937, to E. Houdry. These activated clays, while very cheap, are not especially active and furthermore suffer a gradual decline in catalytic activity on repeated regeneration. It has been suggested that clays of the aforementioned types be employed in the previously mentioned conversion process without any activating treatment by acid or otherwise but such materials are almost invariably so inactive as to merit no consideration. It has been found that satisfactory catalysts for the previously mentioned conversion process may be prepared by drastically overtreating clays of the aforementioned types so that the resulting products exhibit little if any catalytic activity and then impregnating said overtreated materials with aluminum oxide in the proper quantity.

The use of synthetic silica-alumina complexes as catalysts for accelerating the conversion of hydrocarbons of relatively low value and utility into hydrocarbons of higher value and utility has also been suggested. For example, the product formed by the hydrolytic adsorption of alumina on silica gel has been suggested and has been commercially used as a catalyst for accelerating the conversion of gaseous olefines into liquid hydrocarbons boiling within the usual gasoline range. For further information on this subject, reference may be had to United States Patent 2,068,016, issued January 19, 1937, to F. H. Gayer. Similarly, a product formed by the hydrolytic adsorption of alumina on silica gel has been suggested and has been commercially used as a catalyst for accelerating the conversion of hydrocarbons boiling above the usual gasoline range into hydrocarbons boiling within the usual gasoline range. For further information on this subject reference may be had to my copending application, Serial Number 305,473, filed November 21, 1939. Also the product formed by the union of silicic acid or a salt thereof with aluminum hydroxide or an aluminum salt has been suggested as a catalyst for accelerating the conversion of hydrocarbons boiling above the usual gasoline range into hydrocarbons boiling within the usual gasoline range. For further information on this subject, reference may be had to my copending application, Serial Number 305,472, filed November 21, 1939. This silica-alumina complex, prepared by the union of silicic acid or a salt thereof with aluminum hydroxide or a salt of aluminum may also be employed to advantage as a catalyst to accelerate the conversion of gaseous olefines into liquid hydrocarbons boiling within the usual gasoline range. All of these synthetic silica-alumina complexes, while exhibiting satisfactory activity and satisfactory stability on repeated regeneration, are quite expensive to prepare.

Briefly, the instant invention relates to improved catalysts for the acceleration of various conversion reactions, said catalysts being produced by the substantially complete removal of elements in six-coordination, that is elements within an octahedral group of oxygen and/or hydroxyls, from certain natural hydrated magnesium aluminum silicates, said catalysts being further characterized by the fact that they are obtained in the form of flakes, sheets or plates of little thickness and large area and hence exhibit a high surface to volume ratio. Additionally, the instant invention embraces in its purview methods for the preparation of said improved catalysts and to processes in which said improved catalysts are employed to accelerate various conversion reactions.

One of the objects of my invention is the provision of catalysts of novel physical form for accelerating chemical reactions and methods for the preparation thereof.

One other object of my invention is the provision of catalysts and methods for the preparation thereof, said catalysts being useful for accelerating the conversion of hydrocarbons of relatively low value and utility into hydrocarbons of higher utility and value, said catalysts being readily and economically prepared from natural hydrated magnesium aluminum silicates, said catalysts being further characterized by the fact that they are obtained in the form of flakes, sheets or plates of little thickness and large area.

An additional object of my invention is the provision of catalysts and methods for the preparation thereof, said catalysts being useful for accelerating the conversion of hydrocarbons boiling above the usual motor fuel range into hydrocarbons boiling within the usual motor fuel range, said catalysts being readily and economically prepared from certain natural hydrated magnesium aluminum silicates, said catalysts being further characterized by the fact that they are obtained in the form of sheets, flakes or plates of little thickness and large area.

Another object of my invention is the provision of catalysts and methods for the preparation thereof, said catalysts being useful for accelerating the conversion of hydrocarbons boiling within the usual motor fuel range into other hydrocarbons of higher utility and value also boiling within the usual motor fuel range, said catalysts being readily and economically prepared from certain natural hydrated magnesium aluminum silicates, said catalysts being further characterized by the fact that they are obtained in the form of flakes, sheets or plates of little thickness and great area.

A further object of my invention is the provision of catalysts and methods for the preparation thereof, said catalysts being useful for accelerating the conversion of gaseous olefines into hydrocarbons boiling within the usual motor fuel range, said catalysts being readily and economically prepared from certain natural hydrated magnesium aluminum silicates, said catalysts being further characterized by the fact that they are obtained in the form of sheets, plates or flakes of little thickness and large area.

An additional object of my invention is to provide improved processes for the conversion of hydrocarbons of relatively low value and utility into hydrocarbons of higher value and utility, said conversion being accelerated by catalysts prepared from certain natural hydrated magnesium aluminum silicates, said catalysts being further characterized by the fact that they are obtained in the form of sheets, flakes or plates of little thickness and large area.

A further object of my invention is to provide improved processes for the conversion of hydrocarbons boiling above the usual gasoline range into hydrocarbons boiling within the usual gasoline range, said conversion being accelerated by catalysts prepared from certain natural hydrated magnesium aluminum silicates, said catalysts being further characterized by the fact that they are obtained in the form of flakes, plates or sheets of little thickness and large area.

Another object of my invention is to provide improved processes for the conversion of hydrocarbons boiling within the usual motor fuel range into other hydrocarbons of higher utility and value also boiling within the usual motor fuel range, said conversion being accelerated by catalysts prepared from certain natural hydrated magnesium aluminum silicates, said catalysts being further characterized by the fact that they are obtained in the form of flakes, sheets or plates of little thickness and large area.

An additional object of my invention is to provide improved processes for the conversion of gaseous olefines into hydrocarbons boiling within the usual motor fuel range, said conversion being accelerated by catalysts prepared from certain natural hydrated magnesium aluminum silicates, said catalysts being further characterized by the fact that they are obtained in the form of flakes, plates or sheets of little thickness and large area.

Various other objects and features of my invention will become apparent as the description thereof proceeds.

As is well known to those skilled in the art, there exists a complex group of related hydrated magnesium aluminum silicates, variously designated as vermiculite, zonolite, mikolite, jeffersite, kerrite, maconite, et cetera. For simplicity and convenience these natural hydrated magnesium aluminum silicates, which are employed in the preparation of the catalysts of the instant invention, will hereinafter be termed vermiculite. Some mineralogists of note have doubted whether vermiculite is entitled to the rank of a mineral species but it would appear that not only is vermiculite a distinct mineral species but it embraces several varieties, some of which almost rise to the dignity of separate species. This mineral is generally formed as the result of alteration of biotite, phlogopite or other varieties of mica.

While several minor points remain to be elucidated, the broad principles of the structure of vermiculite have been well established. Gruner (American Mineralogist, volume 19, pages 557–575, 1934) gives as an average analysis of seven vermiculites the following:

|  | Percent |
| --- | --- |
| $SiO_2$ | 35.04 |
| $Al_2O_3$ | 14.55 |
| $Fe_2O_3$ | 5.13 |
| $FeO$ | 0.59 |
| $NiO$ | 2.44 |
| $MgO$ | 21.71 |
| $CaO$ | 0.46 |
| $H_2O$ | 19.99 |

It is seen that the mineral consists essentially of a hydrated magnesium aluminum silicate.

Pauling (Journal of the American Chemical Society, volume 51, page 1010 et seq., 1925) was the first to set forth the fundamental structural principles that are exhibited by mica type minerals to which vermiculites belong. These principles are as follows:

1. Only silicon and aluminum can exist in four-coordination, that is as elements surrounded by four oxygens and/or hydroxyls tetrahedrally placed.

2. In the mineral there are four atoms of such elements in four-coordination for each twelve oxygens and/or hydroxyls.

3. In the mineral there are three atoms in six-coordination, that is elements surrounded by six oxygens and/or hydroxyls octahedrally placed for each twelve oxygens and/or hydroxyls.

Accordingly, the formulas of the above minerals reduce to, fundamentally, $M_4N_3(O$ and/or $OH)_{12}$, where M represents elements in four-coordination (silicon and/or aluminum) and N represents elements in six-coordination (aluminum, magnesium, iron, nickel, calcium, et cetera).

On the basis of the above quoted principles and analysis, Gruner believed the theoretical composition of vermiculite to be:

| | Percent |
|---|---|
| $SiO_2$ | 36.71 |
| $Al_2O_3$ | 14.15 |
| $Fe_2O_3$ | 4.43 |
| MgO | 26.42 |
| $H_2O$ | 20.09 | equivalent to $22SO_2 \cdot 5Al_2O_3 \cdot Fe_2O_3 \cdot 22MgO \cdot 40H_2O$. Dividing this formula by eight there results:

$$(Si_{2.75}Al_{1.25})(Fe_{0.25}Mg_{2.75})O_{10.5} \cdot 5H_2O$$

Distributing oxygens and hydroxyls in a somewhat arbitrary manner to give a total of twelve, there results:

$$(Si_{2.75}Al_{1.25})(Fe_{0.25}Mg_{2.75})O_9(OH)_3 \cdot 3.5H_2O$$

As mentioned, all of the fine points of the vermiculite structure have not been elucidated and space does not permit a review of the points that have been established. For further information reference may be had to Gruner (loc. cit.), Bragg, Atomic Structure of Minerals, Cornell University Press, 1937, pages 204, 219 et seq., and Hendricks and Jefferson (American Mineralogist, volume 23, pages 851–875, 1938). Suffice to say, vermiculite consists of sandwiches comprising top and bottom sheets of elements in four-coordination, surrounded of course by the necessary oxygens and/or hydroxyls, with a sheet of elements in six-coordination in between, these also being surrounded by the necessary oxygens and/or hydroxyls. (Some of the oxygen atoms may be and are shared by an element in four-coordination and an element in six-coordination. In this way the several layers of the sandwich are held together.) Each sandwich is separated from sandwiches above and below by layers of water molecules.

As has been mentioned, vermiculite exists in the form of several more or less distinct varieties. An examination of the previously given general formula, $M_4N_3(O$ and/or $OH)_{12}$, in the light of the principles already briefly outlined shows why this is true. The four-coordinated elements M (silicon and aluminum) may be present in a number of permissible ratios. The same is true for the six coordinated elements N (iron and magnesium). It is seen that it is possible to have a number of minerals having the structure of vermiculite but differing more or less in chemical composition and physical properties.

All vermiculites possess one property in common—all undergo exfoliation when suitably treated. When a vermiculite is strongly heated it expands enormously in a direction perpendicular to the plane of the aforementioned sheets. The flat mica-like plates of the original mineral separate greatly as exfoliation proceeds while the area of the mineral particle remains substantially unchanged. Exfoliation can roughly be compared to the expansion of an accordion. By applying pressure in the appropriate direction, the exfoliated particles can be compressed nearly to the original dimensions prior to exfoliation. The expansion on exfoliation may be as great as sixteenfold or even more and the resulting product may have a bulk density as low as six pounds per cubic foot or even less. Most authorities attribute exfoliation to the loss of water from between the sandwiches, the process being pictured as a further separation of the sandwiches due to the explosive evolution of steam. This does not appear to be a logical explanation of the phenomenon since other minerals of somewhat similar structure do not exfoliate when water between their sandwiches is removed; in fact, the structures of many minerals when so treated actually collapse. Furthermore, certain varieties of vermiculite can be exfoliated at room temperature as will hereinafter become apparent. Here surely, explosive elimination of steam cannot account for the expansion observed. It is believed that exfoliation is due to the puckering of the sandwiches due to the application of heat or other influences. According to this theory, the previously plane sandwiches become corrugated and hence after exfoliation give a mineral particle that is much larger than before.

While all vermiculites exfoliate, as far as this and other properties are concerned, many differences between varieties have been observed. While it is impossible to go into detail concerning all variations that have been noted, certain differences between two very common varieties will be mentioned to indicate variations that may be expected. One variety, hereinafter referred to as Southern vermiculite, comes from the Georgia-Carolinas district, the other, hereinafter referred to as Western vermiculite, comes from Montana. It is to be understood however that these names are adopted for convenience only since vermiculites of widely differing properties may be obtained from a single district or even from a single deposit.

The Southern vermiculite is obtained in the form of glistening golden brown laminated lumps which are quite friable, even massive specimens being easily disintegrated by hand. The Western vermiculite is obtained in the form of dark brown laminated plates which, while they can be split with moderate ease, do possess considerable mechanical strength and cannot by any means be classed as friable. Southern vermiculite, when thrown into boiling 33% sulfuric acid, reacts vigorously but does not expand, at least not to any noticeable extent. Western vermiculite, on the other hand, when similarly treated, not only reacts vigorously, but also exfoliates to a very considerable extent. Southern vermiculite, when saturated with concentrated sulfuric acid and then exposed to air, cakes together somewhat but undergoes no other significant physical change. Montana vermiculite, on the other hand, when treated similarly, exfoliates and becomes white. These few miscellaneous observations serve to indicate the variations that may be encountered when working with vermiculite.

In my copending application, Serial Number 317,770, filed February 7, 1940, now U. S. Patent 2,320,799, issued June 1, 1943, the preparation of catalysts from vermiculite is described, involving removal of all materials except silica from the mineral following which the silica, which is obtained in the form of sheets, flakes or plates of great area and little thickness, is impregnated with alumina, magnesia or similar activating materials. I have now found that excellent catalysts can be prepared from vermiculite by a much simpler and more convenient process than that just described. The improved process comprises treating vermiculite under such conditions that all or substantially all elements in six-coordination are removed while all or substantially all elements in four-coordination remain unaffected. There results a silica-alumina complex in the form of sheets, flakes or plates of great area and little thickness. I have found that this material constitutes an excellent contact agent especially suitable for accelerating the conversion of hydrocarbons of relatively low value and utility into hydrocarbons of higher value and utility.

The catalysts prepared pursuant to my invention differ radically from natural occurring or acid treated clays of the bentonite or montmorillonite type and from the synthetic silica alumina complexes that have hitherto been proposed for use in the aforementioned conversion processes. The catalysts of the prior art exist in a particulate or approximately sphere-like form having low surface to volume ratio. Certain of the synthetic silica-alumina complexes which have a substrate of silica gel have, it is true, a large specific surface due to the presence of myriads of microscopic pores in the individual silica gel substrate particles. However, the advantages that should theoretically follow from such large specific surfaces are not realized in practice. This I attribute to two factors (1) slowness of diffusion of reactants or products and (2) sealing of the microscopic pores by carbonaceous residues. In catalytic conversion processes it is axiomatic that for reaction to occur the reactant must reach the catalytic surface. In, for example, the conversion of hydrocarbons boiling above the usual gasoline range into hydrocarbons boiling within the usual gasoline range using a synthetic silica-alumina complex having a silicia gel substrate as catalyst, and having a particulate or approximately spherical form, because of the high molecular weight of the reactants diffusion into the pores of the substrate is extremely slow so that, in effect, the active portion of the catalyst corresponds approximately to the gross geometrical surface thereof. If on the other hand, an attempt is made to convert a gaseous olefine to a liquid hydrocarbon boiling within the gasoline range using a similar catalyst, the reactants, being of low molecular weight, diffuse with comparative ease into the microscopic pores but the products, especially those traces of products boiling above the usual gasoline range, being of much higher molecular weight, leave the pores with slowness so that again, in effect, the active portion of the catalyst corresponds approximately to the gross geometrical surface thereof. Additionally, in all these hydrocarbon conversion processes, more or less carbonaceous residue of low hydrogen to carbon ratio is formed as by-product. This carbonaceous residue effectively seals the microscopic pores of the catalysts of the prior art and prevents diffusion of reactants into or of products from the interior of the silica gel substrate.

It is seen that if the catalysts of the prior art having a particulate or approximately spherical shape could be rolled out into sheets, plates or flakes of great area and very little thickness, many advantages would follow. I have discovered that highly active silica-alumina catalysts having this preferred physical form may be made from vermiculite by the process previously indicated. For the better understanding of this phase of my invention several illustrative examples will now be given describing suitable methods for the preparation of said improved catalysts.

Example 1

One hundred parts by weight of vermiculite plates (Libby, Montana), all of which passed through a two mesh sieve, were just covered with concentrated sulfuric acid (d. 1.84), 110 parts by weight being required. After standing for 12 hours the material was spread out in thin layers and occasionally turned. In 48 hours the vermiculite was almost completely exfoliated and most of the individual particles had turned white. The resulting material was added to a large volume of water (220 parts by weight) and the suspension was brought to a boil and was then filtered, the resulting precipitate being washed and dried to form the finished catalyst.

Example 2

Exactly like Example 1, except that the vermiculite, after saturation with concentrated sulfuric acid, instead of being exposed to air was steamed for one hour to bring about exfoliation.

Example 3

Exactly like Example 1, except that the vermiculite, after being saturated with strong sulfuric acid was treated, during mixing, with a fine aqueous mist to bring about exfoliation.

Example 4

One hundred parts by weight of Southern vermiculite (through a four mesh sieve) were made into a thick paste with concentrated sulfuric acid (o. 1.84), 110 parts by weight being required. After standing for 12 hours the paste was exposed to air. No particular visible change occurred except that the particles cement themselves together somewhat. Accordingly, after 48 hours the material was added to 220 parts by weight of water, the suspension was brought to a boil and then filtered, the precipitate being washed and dried to form the desired catalyst.

Example 5

To 2000 cc. of water are added 1440 cc. concentrated sulfuric acid (d. 1.84). To this hot solution is added, as rapidly as possible, 1200 g. Southern vermiculite (through a four mesh sieve). While the vermiculite is added rapidly, care is taken to prevent the reaction from getting out of hand. To this end, during the addition of the vermiculite, about 1000 cc. water are added as required to moderate the reaction and to thin the reaction mixture. When addition is complete the reaction mixture is boiled and agitated, the total treating time from the start of the addition of vermiculite being about 90 minutes. The reaction mixture is filtered hot and the resulting cake is washed and dried to form the finished catalyst.

Example 6

To 2200 cc. of water are added 1100 g. concentrated sulfuric acid (d. 1.84). The resulting hot dilute acid is stirred and to it is added, as rapidly as possible, 1000 g. Western vermiculite (through a two mesh sieve). The material expands greatly. After addition is complete, the suspension is stirred for one hour additional and filtered, the resulting cake being washed and dried to form the desired catalyst.

I have found that on treating vermiculites in accord with the foregoing examples, elements in six coordination are first removed. Under more severe conditions, the four-coordinated aluminum is also removed, the ultimate product being practically pure silica. To illustrate this more specifically, reference may be had to Example 5. I have found that the total treating time, if extended to three hours instead of the 90 minutes specified, results in the formation of practically pure silica. At the start of the reaction the mineral has of course its original composition. As the reaction proceeds I have found that elements in six-coordination are removed rapidly while aluminum is removed at a much slower rate. When all six-coordinated elements have been removed the greater part of the aluminum still remains and on further treatment this too is practically completely removed. It is obvious then, that by proper variation in operating technique, catalysts of practically any silica-alumina ratio between the approximate limits 4.5–5.0 to infinity may be prepared. Catalysts of different silica-alumina ratios show somewhat differing activities when employed and while a certain ratio may result in optimum catalytic properties in one conversion process, another ratio may be preferable for use in a different conversion process.

It is obvious that no more than the general principles involved in removing six-coordinated elements can be set forth since many factors influence the speed of such reactions, among these being the variety of vermiculite employed, the size of the particles treated, the strength of the acid used, the size of the batch treated, et cetera. It can be said however that once all these factors are fixed on the basis of a few analyses and catalytic tests successive batches processed under the selected conditions will give materials of substantially the same catalytic activity.

As a further general guide the following observations may be made: Southern vermiculite treats more rapidly than Western, this in spite of the fact that Western vermiculite usually exfoliates more or less completely when processed. Small vermiculite particles treat more rapidly than large as would be expected. Up to certain limits strong acid is more effective than weak; in general, best results are obtained with acid of from 33% to 50% strength. Approximately 110 pounds of concentrated acid are theoretically required to remove all six-coordinated elements and all aluminum from 100 pounds of vermiculite. Although usually aluminum is not to be removed to any substantial extent it is advisable nevertheless to use at least this amount of acid to give a driving force to the reaction. More acid can be used to further increase reaction speed but in general no great advantages accrue from the use of more than twice the theoretical amount of acid mentioned. Some saving in acid may be achieved by operating according to the well known counter-current principle. Vermiculite charge is allowed to fall through an ascending stream of hot dilute acid, treated material being removed from the bottom of the tower by a screw or similar means. Any drainage from the material removed and the wash water from the first one or two washings thereof are used to furnish part or all of the water required to dilute fresh concentrated acid added to the tower.

Contrary to expectations, the processing of heat exfoliated vermiculite is usually no better and often much less satisfactory than the processing of material that has not been thermally exfoliated. In the processing of massive vermiculite, the opportunities for attack by the acid are comparatively limited as compared with those presented by exfoliated material. However the speed of processing of exfoliated vermiculite is not in proportion to the enhanced surface presented to the acid in comparison with the massive material. This is attributed to the fixing of magnesia, iron oxide, et cetera in the structure due to the elevated temperatures used in exfoliation. Accordingly, the massive mineral, while presenting comparatively little area to acid attack, contains materials in a very labile state and hence processing is fairly rapid. On the other hand, while the impurities in heat exfoliated vermiculite are rather firmly bound in the mineral structure, because of the large surfaces exposed processing is again fairly rapid. Also it has been observed with heat exfoliated vermiculite that the difference in rate between the removal of six-coordinated elements and aluminum is usually quite small so that it is difficult to remove substantially all six-coordinated and leave aluminum substantially unaffected. This is attributed to the preferential fixing or freezing of six coordinated elements into the structure during the heating. When it is desired to make catalysts of high silica-alumina ratio thermally exfoliated vermiculites can be used sometimes to great advantage. Vermiculites exfoliated in the cold do not show this freezing or fixing effect and accordingly removal of elements in six-coordination by subsequent or simultaneous acid treatment is facilitated. Cold exfoliation is shown in Examples 1, 2, 3 and 6. Cold exfoliation can be brought about by other methods (assuming of course that the variety of vermiculite being processed is capable of cold exfoliation) for example, by treating the mineral in the cold with an aqueous solution of a strong oxidizing or reducing agent such as hydrogen peroxide, chromium trioxide, potassium permanganate, sulfur dioxide and the like. When such a method is employed, care should be taken to operate in acid solution since otherwise alkali ions are prone to replace part or all of the water layers between the sandwiches to give micas. While such elements can be removed by treatment with acids, complete removal is somewhat difficult and, as a rule, catalysts containing such elements exhibit low activities.

While the processing of vermiculite by digesting with dilute sulfuric acid at or near the boiling point at atmospheric pressure is a perfectly satisfactory operation, if desired, the processing may be accomplished more rapidly by operating at higher temperature under correspondingly elevated pressure. Processing at elevated temperatures and pressures is especially effective when the massive material is being handled.

While the processing of vermiculite by treatment with dilute sulfuric acid has been described in the examples, it is obvious that any strong acid, except hydrofluoric acid, may be used for the purpose, for example, nitric acid, hydrochloric acid or a mixture of the two (aqua regia).

If desired, catalysts prepared in conformity with the foregoing examples may be impregnated with compounds of catalytically active elements. This step may be taken when it is desired to form catalysts containing a plurality of catalytically active elements. Also, the catalyst substrate may be reimpregnated with a compound of aluminum when, through mischance, too much aluminum is removed from the vermiculite during the processing thereof. This impregnation may be accomplished as described in my copending application, Serial No. 317,770, filed February 7, 1940, now U. S. Patent 2,320,799, issued June 1, 1943, or other suitable methods may be employed. For example, if desired, catalysts prepared as described in the foregoing examples may be dried and then impregnated with a non-aqueous solution of compounds of catalytically active elements such as copper, magnesium, zinc, aluminum or iron, following which the solvent is evaporated, the remaining metal compound then being hydrolyzed or not as desired.

The final catalysts obtained by the procedures outlined above are in the form of plates, flakes or sheets of extreme thinness. In general, this physical form is not suitable for most catalytic processes. As has been explained in considerable detail in my copending application, Serial No. 313,898, filed January 15, 1940, now U. S. Patent 2,323,728, issued July 6, 1943, catalytic processes may be divided into three main groups with respect to the way of contacting catalyst and charge. These are:

1. Processes in which the catalyst is disposed in a stationary bed.
2. Processes in which the catalyst is moved continuously or intermittently through the reaction zone.
3. Processes in which the catalyst is suspended in the reactant and the suspension is then passed through the reaction zone.

For processes 1 and 2 catalysts in the form of flakes, plates or sheets are not particularly suitable, catalysts in the form of discrete particles of appreciable size are preferable. For process 3, small, easily suspended particles are desirable and it is evident that the catalyst formed in accord with the present invention is of ideal physical form for this purpose.

To render the catalysts formed in accord with the present invention suitable for use in the first two processes named, these plates, flakes or sheets may be mechanically formed into aggregates constituting discrete particles by pelleting in a pill machine or by extrusion with or without a suitable binding material. One eminently suitable method for forming the small thin plates, flakes or sheets into aggregates constituting discrete particles comprises adding from 5 to 25%, preferably from 10 to 15% of bentonite clay to the finished but undried or only partially dried catalyst. After thorough mixing the whole is passed through an extrusion machine provided with a cutter to produce cylinders of any desired size which are then dried.

To further illustrate the applications of the catalysts of this invention, the following examples are given:

Example 7

A catalyst prepared in accord with Example 1 is thoroughly mixed with 10% untreated bentonite (the commercial variety known as Volclay bentonite being employed) and sufficient water to form a rather dry mixture. The mixture is extruded, the resulting spaghetti being cut so as to form cylinders which after drying are about ¼ inch in diameter and ¼ inch high. The resulting pellets are disposed in a suitable reactor and contacted therein with a refinery butane cut containing 15% isobutene and 30% normal butenes which is passed therethrough at a temperature of approximately 200° C. and a pressure of 1500 pounds per square inch. Under these conditions the conversion of isobutene to liquid hydrocarbons is practically quantitative and more or less of the normal butenes react similarly depending upon the contact time. If the gas mixture is passed at a rate of 10 cubic feet (standard conditions) per hour per pound of catalyst, reaction of the normal butenes is practically quantitative, while at a rate of 40 cubic feet per pound of catalyst about half of the normal butenes react.

Similar results are obtained by substituting the catalysts of Examples 2-6 for that employed in the instant example.

Example 8

Catalyst pellets prepared as described in Example 7 and made from material prepared as described in Example 4 are disposed in a suitable low pressure reactor and are contacted therein with the vapors of hydrocarbons boiling above the usual gasoline range by passing therethrough the vapors obtained from a Mid-Continent gas oil having an A. S. T. M. initial of 482° F. and an A. S. T. M. endpoint of 748° F. and an A. P. I. gravity of 35.4°. The gas oil charge is heated to a temperature of 825-950° F., is vaporized, and the vapors are passed over the catalyst at rather low pressure, for example, 50 pounds per square inch. As much as 60% of the charge is converted to liquid hydrocarbons boiling within the usual gasoline range, the exact amount of conversion obtained in various experiments depending upon the operating temperature and contact time employed. The contact time may vary from that obtained by passing the charge to the reactor at a rate of 0.5 volume of charge (measured as liquid) per volume of catalyst space to 2.0 volumes per hour per volume, more or less.

Similar results are obtained when using catalysts prepared in accord with Examples 1, 3, 2, 5 and 6.

Example 9

Catalyst pellets prepared in accord with Example 7 and made from material prepared as described in Example 5 are disposed in a suitable low pressure reactor. Heavy naphtha from Mid-Continent crude, having an approximate boiling range of from 250° to 400° F. is vaporized and passed through the catalyst at a rate of from 1.0 to 4.0 volumes of charge (measured as liquid) per hour per volume of catalyst space. The portion of the product formed that falls within the usual light naphtha boiling range exhibits a motor knock rating of from 78 to 80. The yield of this product depends upon the operating temperature and time of contact. Operating temperatures may be within the range 825° to 950° F. Particularly good results are obtained at a flow rate of 1.0 (as previously defined) and an operating temperature of 850° F.

Similar results are obtained when using catalysts prepared in accord with Examples 1, 2, 3, 4 and 6.

Example 10

An East Texas heavy naphtha having an initial boiling point of 250° F. and a final boiling point of 400° F. was pumped up to a pressure of 6000 pounds per square inch following which it was passed through a pipe still and heated to a temperature of 650° F. The heated naphtha was discharged into a catalytic reactor maintained at the same temperature and filled with catalyst pellets prepared in accord with Example 7 and made from material prepared as described in Example 6. The flow rate was 0.5 volume of naphtha (measured as liquid) per volume of catalyst space per hour. The reaction products were subjected to conventional fractionation and stabilization operations to produce a butane-free 250° F. endpoint light naphtha of 7 pounds Reid vapor pressure, 79 octane number and zero acid heat. Similar results are obtained when using catalysts prepared in accord with Examples 1 to 5 inclusive.

Example 11

A heavy viscosity breaker gas oil was passed through a pipe still and heated to an elevated temperature. The thus heated charge was mixed with heated catalyst prepared in accordance with Example 4 in the ratio of 2.0 pounds of catalyst per pound of oil. This admixture with hot catalyst immediately brought the oil temperature to 950° F. and resulted in the substantially complete vaporization thereof. The suspension of catalyst in the vaporized oil was passed through an elongated tubular reactor, the material therefrom being separated into solid catalyst and vaporous hydrocarbon reaction products. On working up these last by conventional procedures, 42% of 80 octane number (motor) gasoline was obtained. The separated catalyst, after steaming to remove adsorbed and absorbed hydrocarbons therefrom, was suspended in a heated stream of air and the suspension was passed through a tubular regenerator wherein carbonaceous matter was burned from the catalytic surfaces. Resulting hot, regenerated catalyst was separated from gaseous combustion products and was passed to the fresh feed leaving the aforementioned pipe still to complete the heating and vaporization thereof.

Example 12

The residual gas from a catalytic polymerization unit processing a refinery butane cut under such conditions that substantially only isobutene reacts is passed at a temperature of 500° C. over a catalyst prepared in conformity with Example 7. The gas is passed at a rate of 250 volumes of gas (standard conditions) per hour per volume of catalyst space. During reaction a portion of the olefines present polymerize to liquids but the greater part are recovered as gases. However, although the charge contained practically no isobutene, almost half of the C₄ olefines in the product are isobutene. Similar results are obtained using catalysts prepared as described in Examples 2 to 6.

Example 13

The highly olefinic liquid obtained by the catalytic polymerization of the C₃ cut of refinery gas was passed over a catalyst, prepared in accordance with Example 7 and made from material prepared as described in Example 4, at a temperature of 400° C. and at a slight superatmospheric pressure sufficient to overcome pressure drop through the apparatus. About four volumes of liquid charge were passed to the reactor per hour per volume of reaction space. The resulting products were separated by conventional means into liquids which were recycled, gases containing hydrocarbons of three carbon atoms which were sent to the previously mentioned polymerizer and gases containing hydrocarbons of four carbon atoms. These last were compressed to a pressure of 1500 pounds per square inch and were passed through a second catalytic polymerization reactor also filled with catalyst prepared in conformity with Example 7 from material made as described in Example 4. The operating temperature was 225° C. and the flow rate was 20 cubic feet of gas (standard conditions) per hour per pound of catalyst. The polymer on hydrogenation, exhibited an octane number of 94 motor. Similar results were obtained when employing other highly olefinic liquids, e. g. reformed naphtha and cracked gasoline.

Similar results were obtained when using catalysts prepared in accord with Examples 1, 2, 3, 5 and 6.

Regeneration of catalysts is described in Example 11. It is to be understood that from time to time the catalysts being utilized as described in Examples 7, 8, 9, 10, 12 and 13, or otherwise, require regeneration. When operating in conformity with the fixed bed technique it is customary to employ a plurality of reactors, one or more being on stream at all times while the catalytic material in one or more others is being simultaneously regenerated, the functions of the two groups of reactors being reversed at appropriate intervals. In practicing the moving catalyst technique, the reactor is full of catalyst which is moved downward therethrough continuously or intermittently at frequent intervals. Exhausted catalyst removed from the bottom of the reactor is then passed through a regenerator, regenerated catalyst therefrom then being moved to the top of the reactor for recirculation therethrough.

While specific details for the preparation and use of the improved catalysts of the instant invention have been described by means of numerous examples, it is to be understood that these are illustrative only and are in no way to be construed as limiting the scope of the instant invention except insofar as these specific details are included in the appended claims.

I claim:

1. A process for converting hydrocarbons of relatively low value and utility into hydrocarbons of higher value and utility which comprises contacting said hydrocarbons of relatively low value and utility at conversion temperature with a modified vermiculite produced by removing from vermiculite by treatment with acid substantially all elements in six-coordination.

2. A hydrocarbon oil conversion process which comprises contacting the oil at conversion temperature with a modified vermiculite produced by removing from vermiculite by treatment with acid substantally all elements in six-coordination.

3. A process for producing gasoline from hydrocarbon oils heavier than gasoline which comprises subjecting the heavier oil to cracking conditions in the presence of a modified vermiculite produced by removing from vermiculite by treatment with acid substantially all elements in six-coordination.

4. A process for increasing the antiknock value of gasoline fractions which comprises subjecting the same to reforming conditions in the presence of a modified vermiculite produced by removing from vermiculite substantially all elements in six-coordination.

5. A process for producing gasoline from gaseous olefines which comprises subjecting the gaseous olefines to polymerizing conditions in the presence of a modified vermiculite produced by removing from vermiculite by treatment with acid substantially all elements in six-coordination.

ROBERT F. RUTHRUFF.